Oct. 13, 1931. C. W. ROBBINS 1,827,209
INDUSTRIAL TRUCK
Filed May 27, 1929

Inventor
Charles W. Robbins
By [signature] Att'y.

Patented Oct. 13, 1931

1,827,209

UNITED STATES PATENT OFFICE

CHARLES WILLIAM ROBBINS, OF LA GRANGE, ILLINOIS, ASSIGNOR TO WESTERN ELECTRIC COMPANY, INCORPORATED, OF NEW YORK, N. Y., A CORPORATION OF NEW YORK

INDUSTRIAL TRUCK

Application filed May 27, 1929. Serial No. 366,157.

This invention relates to industrial trucks, and more particularly to electrically operated trucks for transporting cable reels.

An object of this invention is to provide an industrial truck capable of expeditiously handling, loading, transporting and unloading heavy cylindrical objects.

In accordance with one embodiment the invention contemplates the provision of a truck for transporting cylindrical objects such as cable reels, having apertures therethrough in which an adjustable hooked arm may be inserted for engaging the side of the object away from the truck. The hooked arm is fixed to a pivoted member and cooperates with a pair of laterally adjustable arms to hold an object in position upon the laterally adjustable arms which are adapted to engage the periphery of the object and which are also fixed to the pivoted member. A rack driven by a motor mounted on a pair of resiliently supported inclined members, may be actuated to tilt the pivoted member about its pivot to move an object to be transported into conveying position. Upon actuation of the rack, floor rests formed on the inclined members engage the floor and remain in engagement therewith until the object being tilted into conveying position has been moved to a point where its weight will not tip the truck.

Figure 1:
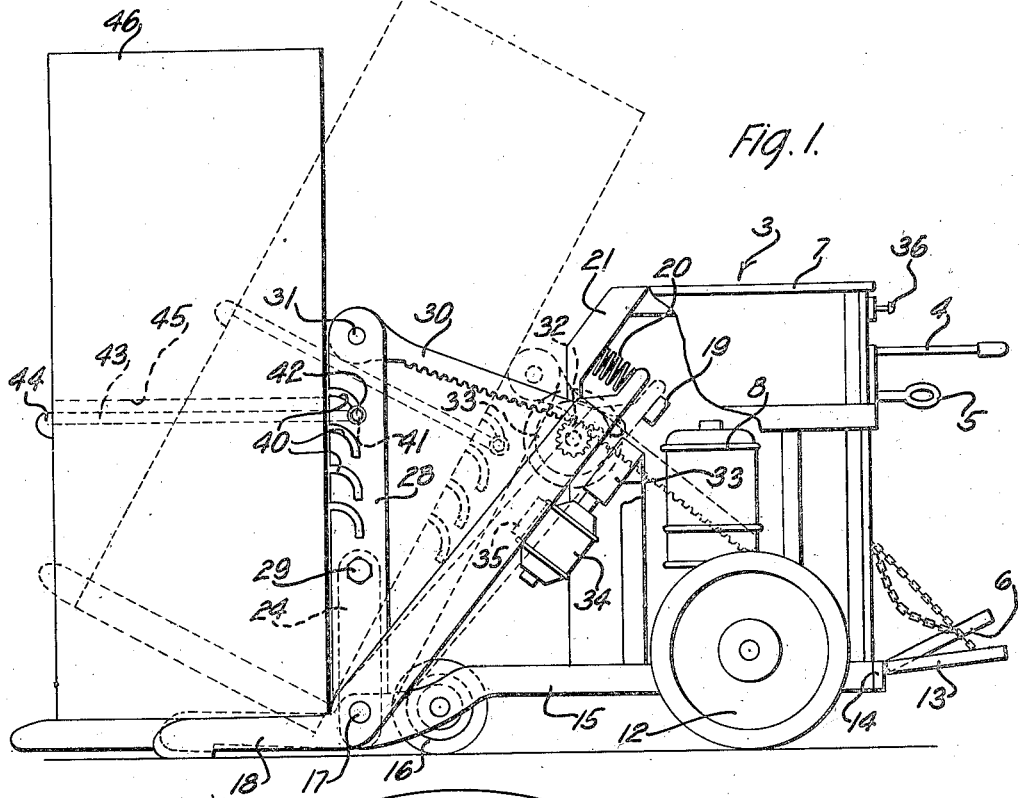
Figure 2:
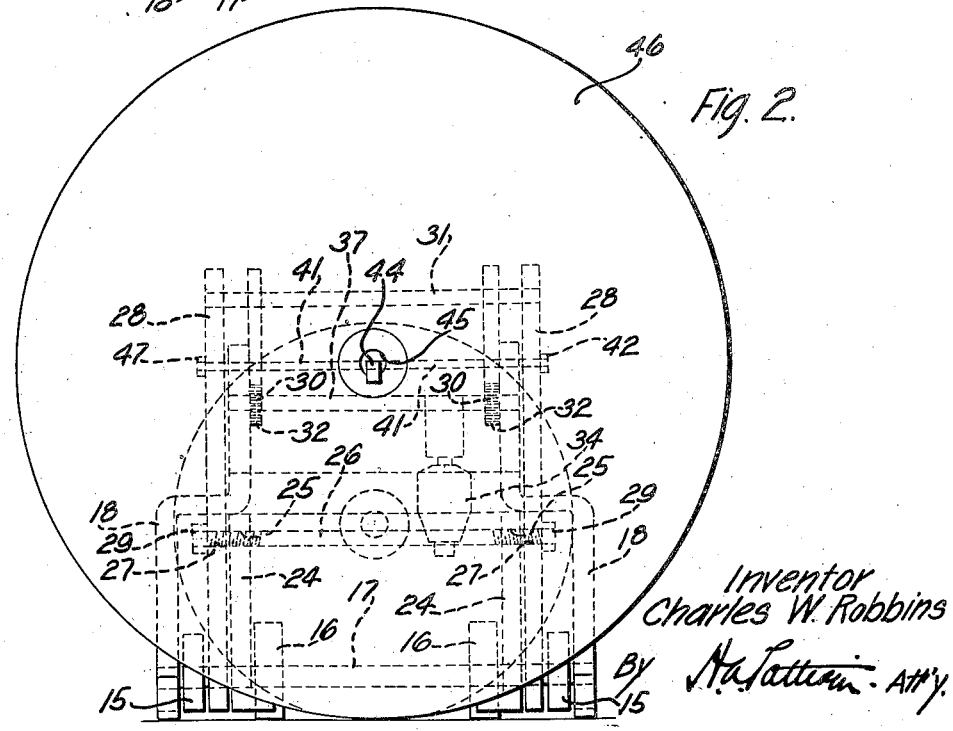

Other features and advantages of the invention will become apparent from the following detailed description thereof, taken in conjunction with the accompanying drawings wherein, Fig. 1 is a side elevational view of an electrical truck embodying the features of this invention, showing a cable reel in place on the truck and the floor rests engaging the floor, and Fig. 2 is an end elevational view of the apparatus shown in Fig. 1.

Referring now to the drawings wherein like reference characters designate the same parts throughout the several views, the numeral 3 designates generally an electrical industrial truck having the usual steering lever 4, a drive control lever 5, a brake controlling treadle 6 and a housing 7 under which is mounted an electrical driving motor 8 of any suitable type and its cooperating gearing and usual electrical storage batteries for supplying energy to the motor. For the sake of clearness and since they do not form a part of the present invention the details of the aforementioned parts have not been shown.

The batteries and motor with its cooperating parts mounted in the housing 7 furnish power to drive wheels 12 and may be controlled through the lever 5 by an operator standing upon a circuit making treadle 13 of the usual type pivotally mounted on a transversely extending member 14 to which longitudinally extending supports 15 are secured.

The driving wheels 12 are mounted in any well known manner and actuated by the motor 8 through suitable gearing not shown, and a pair of trailer wheels 16 are mounted at the forward end of the truck. The supports 15 extend beyond the trailer wheels 16 and are connected by a transversely extending member 17 to which are pivoted a pair of inclined members 18 which are supported at their upper ends by a member 19 which extends from one side of the housing 7 to the other side thereof transversely of the truck, and which is secured to the sides of the housing 7. A compression spring 20 is interposed between a portion 21 of the housing 7 and the inclined members 18 to normally urge the members 18 into engagement with the member 19.

A pair of L-shaped arms 24 are also pivoted to the member 17, their upper ends being provided with apertures 25 threaded in opposite directions. A rod 26 is oppositely threaded to engage the apertures 25 in the arms 24 and is rotatably journalled in apertures 27 formed in normally vertically extending members 28. The outer ends of the rod 26 are provided with hexagonal heads 29 adapted to be engaged by a wrench or like tool for rotating the rod to move simultaneously the arms 24 toward or away from the longitudinal center of the truck along the threaded rod 26 and the member 17.

A pair of racks 30 are pivotally attached to a bar 31 which extends between the members 28. Motion may be imparted to the racks 30, to cause the members 28 to pivot about the member 17, by means of gears 32 mounted on a shaft 37 driven through suitable reduction gearing designated generally by the numeral 33 driven by an electrical motor 34. A cross piece 35 secured at its ends to the members 18 supports the motor 34 which may be controlled by a control lever 36 mounted on the body of the truck in a convenient position for operation by an operator standing on the treadle 13. The motor 34 is connected to the control lever 36 by conductors not shown.

The members 28 are provided with a plurality of slots 40 in which may be positioned a rod 41 having a rectangular cross section at the point where it engages the slots and provided with a head 42 at one end and a nut 47 at the other end for engaging the outer surfaces of the members 28. Fixed to the rod 41 at a point intermediate its ends is an arm 43 having a hook 44 formed on the end thereof for insertion in an aperture 45 of a cable reel 46 of any suitable and ordinary type.

It is believed that a clear understanding of the above described apparatus may be had by reference to the following description of the operation thereof. Assuming that it is desired to transport the cable reel 46 from one place to another, an operator standing upon the treadle 13 and controlling the truck by means of the levers 4 and 5 and the treadle 6 may direct the truck to a point directly opposite the center of the flat side of the cable reel 46. If the arms 24 have been adjusted transversely of the truck to a position for properly engaging the periphery of the cable reel by means of the heads 29 formed on the threaded rod 26 and further assuming that the arm 43 has been adjusted vertically to the desired position, the truck may be driven toward the cable reel so that the arm 43 will enter the aperture 45 in the reel and pass therethrough until the hook 44 formed on the left end (Fig. 1) of the arm 43 engages the side of the reel away from the truck. After the truck has been driven to this position the operator may start the motor 34 by means of the lever 36 thereby causing the rack 30 to be drawn to the right (Fig. 1), whereupon the arms 24 will engage the periphery of the reel 46. The relative movement between the members 18 and the members 28 will, due to the weight of the reel, cause the spring 20 to be compressed, whereupon the left end of the member 18 will be moved downwardly into engagement with the floor, and further movement of the member 18 being impossible the reel will be tilted to the position shown in dotted lines in Fig. 1 which is the conveying position of the reel.

After the reel has been transported to the desired location, the operation of the motor 34 may be reversed and the reel deposited upon the floor, whereupon the hooked arm 43 may be released and the truck backed away from the reel.

It is to be noted that the spring 20 will be compressed due to the relative movement between the member 28 and the member 18 to cause the left end of the members 18 to engage the floor thus preventing the truck from tipping.

What is claimed is:

1. In an industrial truck, a supporting framework, a resiliently supported member pivoted thereto, arms for supporting an object to be transported pivoted to the supporting framework, and means for causing a relative movement between said arms and the resiliently supported member to tilt an object to be transported into a conveying position.

2. In an industrial truck, a supporting framework, means for supporting an object during transportation pivoted thereto, means for moving said supporting means transversely of the truck to accommodate various sizes of objects, a pair of upright members for supporting the pivoted means, means adjustable vertically of the truck to secure objects of various sizes upon the supporting means, means for tilting said supporting means to move an object to a conveying position, and means assisting in supporting said tilting means and adapted to be actuated thereby to engage the floor to prevent tilting of the truck.

3. In an industrial truck, a supporting pivot, a pair of arms mounted upon said supporting pivot for supporting an object, an actuating member mounted upon said supporting pivot, and a threaded member engaging the supporting arms and the actuating member to prevent pivotal movement of the arms relative to the actuating member and operative to move said supporting arms laterally relative to said actuating member.

4. In an industrial truck, a supporting pivot, a pair of arms mounted upon said supporting pivot for supporting an object, an actuating member mounted upon said supporting pivot, means for holding said supporting arms and said actuating member against relative pivotal movement and for adjusting said supporting arms laterally relative to said actuating member, and means for rocking said actuating member and said supporting arms simultaneously about the supporting pivot.

5. In an industrial truck, a supporting pivot, a pair of arms mounted upon said supporting pivot for supporting an object, an actuating member mounted upon said supporting pivot, means for holding said supporting arms and said actuating member against relative pivotal movement, means for rocking said actuating member and said supporting arms about said pivot for tilting an object, and a member pivotally mounted upon said pivot and adapted to engage the floor to prevent tilting the truck, said member being movable to a position clear of the floor when the object is tilted.

6. In an industrial truck, a supporting pivot, a pair of arms mounted upon said supporting pivot for supporting an object, an actuating member mounted upon said supporting pivot, means for holding said supporting arms and said actuating member against relative pivotal movement, means for rocking said actuating member and said supporting arms for tilting the object, a member mounted upon said pivot and adapted to engage the floor to prevent tilting of the truck, and means for moving said member clear of the floor when the object is tilted beyond dead center.

7. In an industrial truck, means for supporting an object during the transportation thereof, means for actuating said supporting means to tilt the object to a conveying position, means adapted to be moved into engagement with the floor by the weight of the object to prevent tilting of the truck during the tilting of the object, and means for moving said floor engaging means free of the floor during the tilting of the object to the transporting position.

In witness whereof, I hereunto subscribe my name this 18th day of May, A. D., 1929.

CHARLES WILLIAM ROBBINS.